Oct. 27, 1931.  M. DUHAMEL  1,828,769
AUTOMATIC TENSIONING DEVICE FOR FLEXIBLE TRANSMISSION MEMBERS
Filed May 13, 1927  2 Sheets-Sheet 1
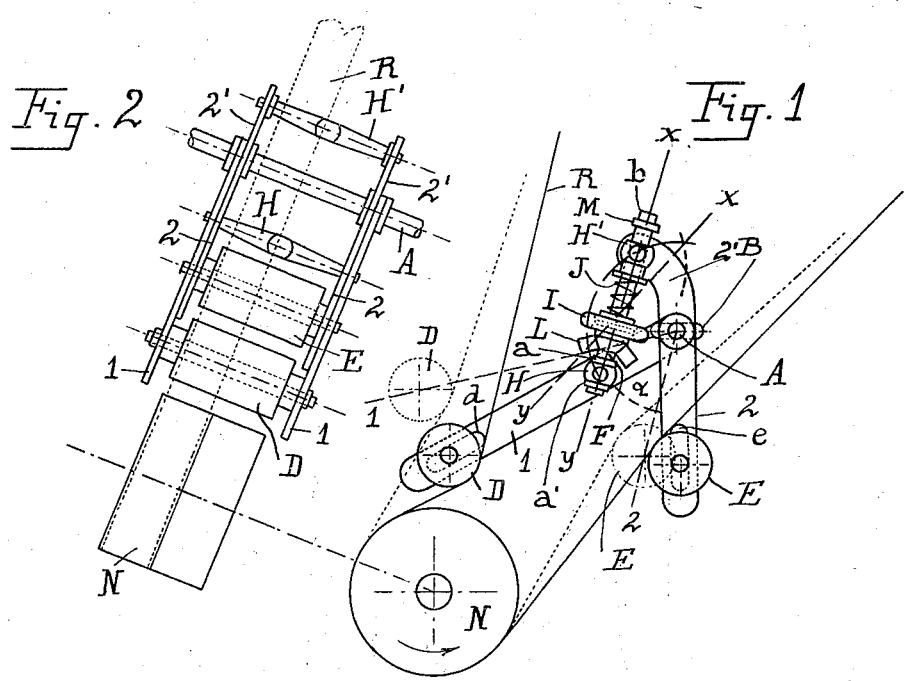
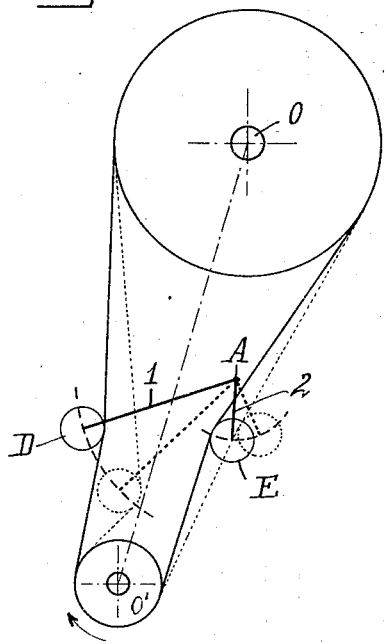
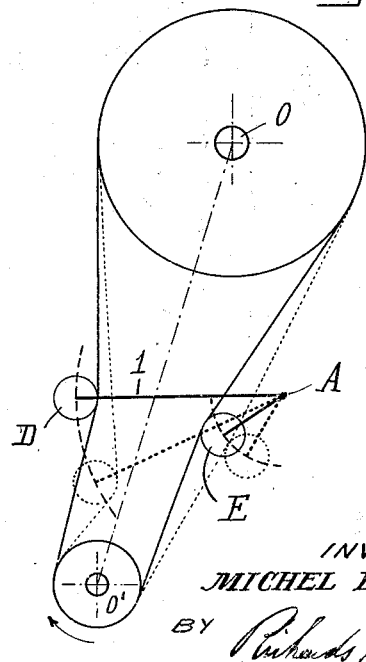
INVENTOR
MICHEL DUHAMEL
BY
ATTORNEYS Oct. 27, 1931.   M. DUHAMEL   1,828,769
AUTOMATIC TENSIONING DEVICE FOR FLEXIBLE TRANSMISSION MEMBERS
Filed May 13, 1927   2 Sheets-Sheet 2
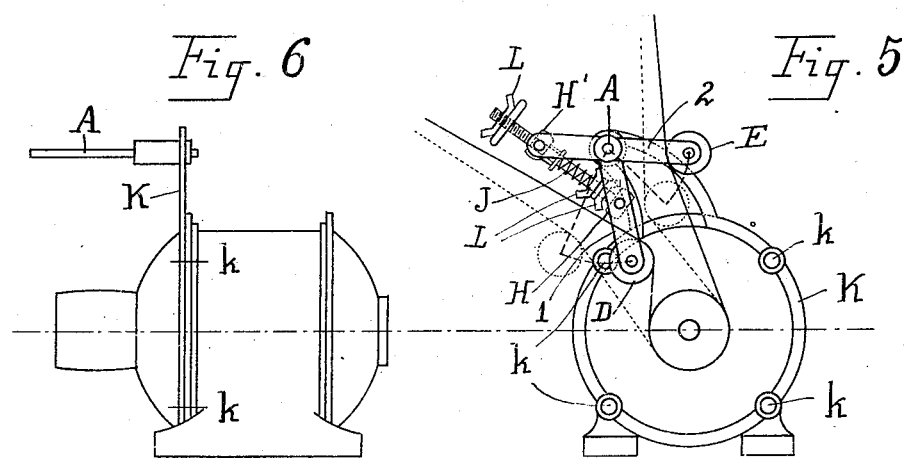
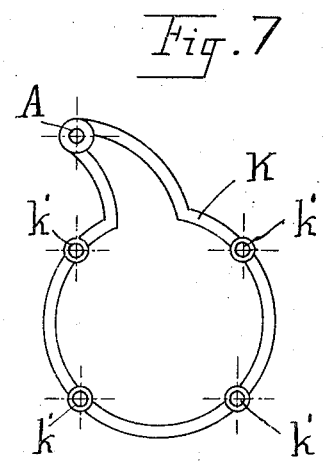
INVENTOR
MICHEL DUHAMEL
BY Richards & Geier
ATTORNEYS Patented Oct. 27, 1931

1,828,769

UNITED STATES PATENT OFFICE

MICHEL DUHAMEL, OF ROUBAIX, FRANCE

AUTOMATIC TENSIONING DEVICE FOR FLEXIBLE TRANSMISSION MEMBERS

Application filed May 13, 1927, Serial No. 191,101, and in France May 15, 1926.

The present invention relates to an automatic tensioning device for flexible transmission members such as belts, cables, etc., adapted for use in any machine in which starting up, variations in power absorbed and other causes, fatigue and lengthen the belts, producing a lack of adherence which leads to slip and is always detrimental to their efficiency.

The object of this invention is to produce a means adapted to reduce the tension of the belts when at rest, and thus avoid, as a consequence, the excessive tension to which the latter are too frequently subjected and to prevent any slip of these flexible members when in motion.

These results are obtained automatically in such a way that the resistance which is to be overcome produces an adherence of the belt while a reduction in the required effort allows said belt to slacken.

Owing to this automatic action a constant ratio of speed between the driving pulley and the driven pulley is provided for and the belt is prevented from doing any useless work thereby lengthening its life.

When a rotary movement is transmitted by a belt, the start and the variations in the absorbed power rapidly fatigue and stretch the belt, the lack of adherence resulting in a slip which is particularly noticeable during each start and each time the driven machine has to pass over one of the highest points of its diagram.

It is known that in any belt entering into action, the part which moves up on the driving pulley receives an excess tension and that on the other hand the other side of the belt slackens and sometimes floats, the effect of which is to reduce, under the action of centrifugal force, the length of the portion of belt surrounding the driven pulley and thus assist in producing slip.

The automatic tensioning device according to the invention is based upon the following principle: a suspended jockey pulley or small loose pulley, placed in contact with the driving side of a belt which is at a higher tension, receives an impulse from the latter which is transmitted, amplified to the desired extent and transformed into a pressure exerted by another jockey pulley or small loose pulley upon the other or slack side of the belt in order not only to keep the latter in contact with its pulley but also to increase the amount of the latter enveloping the pulley and consequently to increase the adherence of the belt.

Various mechanical means may be employed for carrying this principle into effect. By way of example there will now be described a device capable of producing the effect sought and adapted for use with the driving belt of any machine subjected to variations of absorbed power.

The accompanying drawings Figs. 1 to 7 relate to the apparatus embodying the inventive idea carrying the invention into effect.

Fig. 1 is an elevation of the apparatus showing the arrangement of the jockey pulleys and the oscillating arms carrying these pulleys, and also the device for varying the angle of these arms according to the requirements.

Fig. 2 is a side view across a plane parallel to the axis $x$—$y$ of the screw provided for varying the angle of the pivoted lever arms 1 and 2, showing the cross stays carrying this screw and the shaft about which the pivotal movement takes place, this shaft being mounted upon supports, not shown, suited to the machine which is to be provided with this apparatus.

Figs. 3 and 4 are diagrammatic arrangements showing how the pivot for the arms carrying the two rollers may be arranged inside or outside the bands of the belt or cable.

Figs. 5, 6 and 7 relate to the use of an automatic tensioning device as starter with means for easily placing this tensioning device upon the driving electric motor.

Referring to these drawings, the automatic tensioning device is composed of two arms 1 and 2 pivoting about a shaft A suitably suspended upon different supports according to the type of machine which has to carry it. This support is provided if desired with a slot B permitting the shaft A to be displaced according to the distance between the sides of the belt R which passes over the pulley N of the driven machine.

The arms 1 and 2 carry jockey pulleys D and E the shafts of which are mounted in slots $d$ and $e$ formed in the arms 1 and 2, these slots making it perfectly easy to obtain rapidly the desired ratio between the working lengths of the lever arms. The angle $\alpha$ formed between these arms can be varied by means of a screw provided with a hand wheel, lock nut and compression spring, the axis $x$—$y$ of this screw following the variations in the angle $\alpha$.

As will be seen in Figs. 1 and 2 of the drawings, this screw F, provided with a collet $a$, is secured by means of a nut $a'$ in a corresponding hole formed in a central thickened part of the cross stay H movable in the arm 1, while its free end $b$ passes through a similar hole formed in the cross stay H' which is also movable in the extended portions 2' of the arm 2.

The angle $\alpha$ is varied by means of a hand wheel I, through the medium of a spring J, which is optional, and this hand-wheel is lock nut L. A ring or nut M may be used, if necessary to limit the working length of the spring J, when the latter is employed, whatever be the values of the angle $\alpha$ formed between the two arms.

It is to be noted that this spring will be useful each time the machine to which the apparatus is fitted is subjected to shocks.

The operation of the device is as follows:

When the machine is at rest, the device does not exert its action upon the bands of the belt R, the latter then being under the minimum tension (see position, shown in dotted lines of the jockey pulleys D and E). When starting up, the side of the belt which takes up the higher tension (see direction of movement of driven pulley N indicated by the arrow) presses upon the jockey pulley E and consequently the pressure produced by the resistance opposed by the machine which is driven, is exerted upon the slack side of the belt through the medium of the jockey pulley D and not only keeps it wrapped upon the pulleys but increases the surfaces in contact with the pulleys within desired limits.

If the required effort is constant the tensioning device takes up a practically unvarying position. If on the contrary the required effort varies, the tensioning device oscillates between the tightening and slackening of the belt while it always preserves the adherence of the slack side.

This automatic tensioning device, exerts consequently an effective action upon the belt only when the latter is working.

This automatic tensioning device according to the invention, may be employed with advantage as:

1. A starting device for actuating any machine by means of an electric motor.

2. An automatic tension regulating device for belts or cables.

3. A member adapted to obviate the necessity of having to tighten belts up continually or to permit one of the working pulleys to be changed without the necessity of changing the length of the belts or cables. It is pointed out that the rollers D and E are never equidistant from either the axes of the pulleys or from the axis of their oscillating supports. The pivot A of the tensioning device is fixed according to requirements between the two sides of the belts or cables or outside the latter. It can in no case be coincident with a line extending between the axes of the pulleys driven by the belt.

With regard to the arms 1 and 2 carrying the rollers D and E, these will always be of unequal length. It is precisely this essential feature which gives the amplified action, produces the efficiency of the system and makes it useful, economical, or indispensable in the cases enumerated above.

It is known that a drive for machines, in general by a separate motor, is economical, but hitherto this type of drive has not been extended, as would be desirable to machines which operate at a low speed and occasion heavy shocks or numerous stops. The short distance between the axes, the small amount of envelopment of the driving pulley by the belt, the lack of flexibility, in drives are serious obstacles which it has been necessary to take into account.

All these obstacles are removed when use is made of the tensioning device described.

Figs. 5, 6 and 7 show a device according to the invention mounted upon an electric motor.

Fig. 5 shows a front view of the motor with a method of mounting the tensioning device which acts at the same time as starter.

Fig. 6 is a side view of the motor showing the crown made rigid with the motor and the shaft or pivot of the tensioning device which is not shown.

Fig. 7 is a front view of the crown support only.

As will be seen from these figures, the tensioning device is mounted in a simple manner, by means of the crown K secured to the motor by lengthening the cover plate securing bolts $k$ and providing them with additional lock nuts. This crown K is pierced with holes $k'$ corresponding with the bolts $k$ and carries at the desired place the tensioning device pivot A.

The tensioning device itself is formed of two simple supports 1 and 2 pivoted at A; bosses H, H' are formed upon 1 and upon the extended portion of 2 so as to allow the passage of the screw regulating the spring J. The levers 1 and 2 are simple levers so that there is no longer need to provide the cross stays shown in Figs. 1 and 2.

What I claim is:

1. An automatic tensioning device for belts and other flexible transmission members which extend around spaced pulleys, said device including a fixed pivot disposed intermediate said pulleys and between the opposite portions of a belt extending thereabout, an arm carried by said pivot for movement about the same, a second arm carried by said pivot at an angle to the first named arm and having an extension thereon, rollers on said arms engageable with the outer surface of said belt, and a spring connecting said extension with an intermediate point of the first named arm and controlled by the variations in the load on said belt while the same is being driven to cause said arms to change their angular position relative to each other whereby to vary the amount of engagement of the belt with a driving element.

2. An automatic tensioning device for belts and other flexible transmission members which extend around spaced pulleys, said device including a fixed pivot disposed intermediate said pulleys and between the opposite portions of a belt extending thereabout, an arm carried by said pivot for movement about the same, a second arm carried by said pivot at an angle to the first named arm and having an extension thereon, rollers on said arms engageable with the outer surface of said belt, a spring connecting said extension with an intermediate point of the first named arm and controlled by the variations in the load on said belt while the same is being driven to cause said arms to change their angular position relative to each other whereby to vary the amount of engagement of the belt with a driving element, and a screw member extending between said arms to adjust their angular relation.

In testimony whereof I have affixed my signature.

MICHEL DUHAMEL.